UNITED STATES PATENT OFFICE 2,097,137

ETHERS OF 2,4-DINITRO-6-CYCLOHEXYL-PHENOL

Frank B. Smith and Winfield Sunderland, Midland, Mich., assignors to The Dow Chemical Company, Midland, Mich., a corporation of Michigan No Drawing. Application February 25, 1937, Serial No. 127,765

6 Claims. (Cl. 260—150)

This invention relates to the ethers of 2,4-dinitro-6-cyclohexyl phenol and is particularly concerned with compounds having the formula:

$$X-O-CH_2-R$$

wherein X represents a 2,4-dinitro-6-cyclohexylphenyl radical, and R represents an alkyl or phenyl radical, or hydrogen.

We have prepared members of the above new class of compounds, determined certain of their physical properties whereby they can readily be identified, and have found them useful as insecticides and particularly as toxics for inclusion in fly spray compositions.

These compounds are crystalline solids substantially insoluble in water but somewhat soluble in most organic solvents. They are generally light yellow in color and darken on exposure to light. They can be prepared by reacting the silver salt of 2,4-dinitro-6-cyclohexyl phenol with an alkyl or aralkyl halide, e. g. methyl iodide, ethyl chloride, n-propyl bromide, benzyl chloride, etc.

In preparing the new compounds above described, we generally suspend the silver 2,4-dinitro-6-cyclohexyl-phenolate in an inert organic solvent, e. g. chloroform, carbon tetrachloride, etc., and add thereto an alkyl or aralkyl halide at a suitable reaction temperature not in excess of the refluxing temperature of the reaction mixture. Since the reaction is frequently vigorous in nature, it is preferable to add the etherifying agent portion-wise to the silver phenolate and to cool the mixture during such addition. The reaction mixture is then warmed to its refluxing temperature to insure complete reaction, filtered to remove silver halide, and the desired product isolated therefrom by evaporating off the solvent medium, and purifying the resulting residue by fractional crystallization from organic solvent.

Our new compounds may also be prepared by reacting a metallic salt of 2,4-dinitro-6-cyclohexyl phenol, e. g. the sodium salt, with a dialkyl sulfate, e. g. dimethyl sulfate.

The following examples describe in detail the preparation of certain individual members of our new class of compounds, but are not to be construed as limiting the invention:

Example 1

280 grams (0.75 mol.) of silver 2,4-dinitro-6-cyclohexyl-phenolate was suspended in 400 milliliters of chloroform. 142 grams (1.0 mol.) of methyl iodide dissolved in 100 milliliters of chloroform was added thereto, the heat of reaction being sufficient to cause the mixture to reflux vigorously. The reaction mixture was then refluxed for approximately one-half hour on a water bath, filtered hot, and the chloroform evaporated therefrom. 197.5 grams of a dark, viscous residue was dissolved in n-propanol, clarified with bone-charcoal, filtered, and cooled to obtain the crude ether product which was subsequently recrystallized from propanol. The methyl ether of 2,4-dinitro-6-cyclohexyl phenol is a light yellow crystalline material melting at 66°-67° C.

Example 2

In a similar manner 280 grams (0.75 mol.) of silver 2,4-dinitro-6-cyclohexyl-phenolate and 109 grams (1.0 mol.) of ethyl bromide were reacted together in 750 milliliters of carbon tetrachloride. The resulting crude product was recrystallized from n-propanol, whereby 142.5 grams (0.48 mol.) of the ethyl ether of 2,4-dinitro-6-cyclohexyl phenol was obtained in the form of buff-colored crystals melting at 94°-95° C.

Example 3

Silver 2,4-dinitro-6-cyclohexyl-phenolate was reacted in the usual manner with a 10 per cent molecular excess of n-propyl bromide in the presence of carbon tetrachloride. The crude ether product so obtained was recrystallized from methyl alcohol to obtain the n-propyl ether of 2,4-dinitro-6-cyclohexyl phenol in the form of light yellow leaflets melting at 53°-54° C.

Example 4

1 mol. of silver 2,4-dinitro-6-cyclohexyl-phenolate was suspended in carbon tetrachloride and 1.1 mols of benzyl chloride reacted therewith at the refluxing temperature of the reaction mixture. The reaction mixture was filtered hot, and the carbon tetrachloride removed on the steam bath whereby there was obtained a partly crystalline residue. The latter was recrystallized from n-propanol to obtain the benzyl ether of 2,4-dinitro-6-cyclohexyl phenol as a light colored crystalline compound melting at 110.5°-111° C.

In a similar manner etherifying agents such as isopropyl chloride, n-butyl iodide, isobutyl bromide, isoamyl iodide, etc., may be reacted with silver 2,4-dinitro-6-cyclohexyl-phenolate to form the corresponding ether compounds. Among the ethers so prepared are the isopropyl ether of 2,4-dinitro-6-cyclohexyl phenol, the n-butyl ether of 2,4-dinitro-6-cyclohexyl phenol, the isobutyl ether of 2,4-dinitro-6-cyclohexyl phenol, the secondary-butyl ether of 2,4-dinitro-6-cyclohexyl phenol, the isoamyl ether of 2,4-dinitro-6-cyclohexyl phenol, etc.

Representative members of the above-described group of compounds have been tested by the Peet-Grady method as described in "Soap", 8, No. 4, 1932, and found to be particularly valuable as fly spray toxics. For example, a 2 per cent kerosene solution of the methyl ether of 2,4-dinitro-6-cyclohexyl phenol was found to give a kill of over 35 per cent in 24 hours when tested against house flies. A 2 per cent kerosene solution of the ethyl ether of 2,4-dinitro-6-cyclohexyl phenol gave a knock-down of over 45 per cent of the flies contacted therewith when tested in a similar manner.

Other modes of applying the principle of our invention may be employed instead of those explained, change being made as regards the materials employed provided the products described in the following claims be thereby obtained.

We, therefore, particularly point out and distinctly claim as our invention:

1. An ether of 2,4-dinitro-6-cyclohexyl phenol having the formula:

$$X-O-CH_2-R$$

wherein X represents a 2,4-dinitro-6-cyclohexylphenyl radical, and R represents a member of the group consisting of the alkyl and phenyl radicals and hydrogen.

2. An ether of 2,4-dinitro-6-cyclohexyl phenol having the formula:

$$X-O-CH_2-R$$

wherein X represents a 2,4-dinitro-6-cyclohexylphenyl radical, and R represents an alkyl radical.

3. An ether of 2,4-dinitro-6-cyclohexyl phenol having the formula:

$$X-O-CH_2-R$$

wherein X represents a 2,4-dinitro-6-cyclohexylphenyl radical, and R represents an alkyl radical containing not more than 2 carbon atoms.

4. The methyl ether of 2,4-dinitro-6-cyclohexyl phenol.

5. The ethyl ether of 2,4-dinitro-6-cyclohexyl phenol.

6. The benzyl ether of 2,4-dinitro-6-cyclohexyl phenol.

FRANK B. SMITH.
WINFIELD SUNDERLAND.